United States Patent [19]

Norsworthy

[11] Patent Number: 4,539,565
[45] Date of Patent: Sep. 3, 1985

[54] FM/CW RADAR LINEARIZATION NETWORK AND METHOD THEREFOR

[75] Inventor: Keith H. Norsworthy, Bellevue, Wash.

[73] Assignee: The Boeing Company, Seattle, Wash.

[21] Appl. No.: 408,251

[22] Filed: Aug. 16, 1982

[51] Int. Cl.³ .......................... G01S 13/32; G01S 7/40
[52] U.S. Cl. .................................. 343/14; 343/5 NQ; 343/17.7
[58] Field of Search .................... 343/5 NQ, 14, 17.5, 343/17.7

[56] References Cited

U.S. PATENT DOCUMENTS

| | | | |
|---|---|---|---|
| 3,340,529 | 9/1967 | Blitz | 343/14 |
| 3,341,849 | 9/1967 | Cordry et al. | 343/17.7 X |
| 4,008,475 | 2/1977 | Johnson | 343/14 |
| 4,106,020 | 8/1978 | Johnson | 343/17.7 X |
| 4,245,221 | 1/1981 | Kipp et al. | 343/17.7 |

Primary Examiner—T. H. Tubbesing
Attorney, Agent, or Firm—Hughes, Barnard & Cassidy

[57] ABSTRACT

An FM/CW radar linearization network provides target identification data discriminating a target from background reflections and/or false targets by compensating for random variations in the linearity of the frequency sweep of the radar transmitter in the processing of the radar receiver signal, the latter being characteristic of the range and physical size of the target. Linearization is achieved by sampling the transmitter signal, generating an error signal proportional to and indicative of any deviations in the frequency sweep of the transmitter from that for linear operation, and applying that error signal to correct the target data signal, thereby frequency normalizing the same for processing and utilization. A number of alternatives in respect of the development of an appropriate error signal and further alternatives in its use as the basis for data correction are disclosed, including sampling of the transmitter in respect of the phase angle over a predetermined period or the time for a predetermined number of cycles, in order to develop an error signal proportional to and indicative of any deviations in the frequency sweep of the transmitter from that were its operation linear; while data correction may be made in one of a number of alternative ways, including phase rotation of the raw target data input signal, time-shifting of the sampling rate of such data, or frequency mixing the raw target data with an error control signal. Representative networks and suitable methodologies to achieve linearization are disclosed herein.

50 Claims, 10 Drawing Figures

FM/CW RADAR LINEARIZATION NETWORK AND METHOD THEREFOR

BACKGROUND OF THE INVENTION

1. Field of the Invention

The present invention relates, generally, to methods and networks for linearizing an FM/CW radar and, more especially, to such methods and networks which will permit an FM/CW radar to achieve target discrimination. The present invention is particularly adapted for use in association with a missile, permitting target discrimination from background clutter and/or false targets. The present invention is equally well adapted for improving the range resolution of an FM/CW radar aircraft altimeter.

2. Description of the Background Art

FM/CW radar systems are well known and enjoy many applications. FM/CW radar systems offer many advantages over pulse radar systems, which require interrogation signals having high peak power and a fairly precise time reference to obtain adequate target resolution; oftentimes also requiring elaborate precautions against errors which can arise due to variations in, e.g., pulse width of the interrogating signal in order to maintain acceptable target discrimination. On the contrary, FM/CW radar systems, with their frequency modulated continuous interrogation wave, make possible range resolution of a target simply as a function of frequency and further admit of the advantage of continuous measurement without time reference.

The foregoing theoretical advantages to the contrary notwithstanding, FM/CW radar systems are not without their indigenous problems. Crucial to the accurate resolution of a target is the linearity of the sweep of the frequency of the transmitter signal. As these radar systems rely upon the mixing of the interrogation and reflection signals to achieve a beat or difference frequency indicative of the range of a target, any nonlinearity in the sweep of the transmitter frequency will manifest itself as a false or inaccurate indication. More specifically, where the sweep is linear and when the transmitter signal is then mixed with the receiver signal, the optimal result of a single value beat frequency representing range is achieved. However, where the transmitter signal is not swept linearly, the beat frequency achieved upon mixing will vary as a function of time proportional to the degree of nonlinearity. Hence, a point target will appear extended and the reliability of the system for target discrimination is reduced dramatically.

A principal application of FM/CW systems in the past has been as aircraft altimeters. In that context, some deviation from linearity can be tolerated as it is less important to discriminate points from extended targets. Analysis of the reflected signal for the closest apparent target will normally be reliable, whether it be a point target or an extended target. Accordingly, prior approaches to linearizing the system have focused virtually exclusively on control of the transmitter sweep circuitry itself. For example, most have striven toward the control of the modulation of the continuous wave by the use of feedback loops associated with the transmitter circuitry. Sometimes the approaches are fairly simplistic, other times very complex. In either event, however, the objective is the control on the transmitter side of the system.

Representative of certain prior art systems is that disclosed in U.S. Pat. No. 3,341,849. The patentees there are concerned about the inaccuracies inherent in an FM/CW altimeter due to any nonlinearity in operation of the transmitter system. The principal approach to resolution of the problem is the continuous adjustment of the frequency versus time relationship in the transmitter to insure accurate altitude indications during use and over the range of the instrument. This is achieved, in capsule sum, by monitoring the transmitter, applying a coupled signal as one input to a mixer and a delayed signal as another to generate an error signal proportional to any nonlinearity in the transmitter output; this error signal being utilized to control the transmitter modulation circuitry.

U.S. Pat. No. 4,008,475 discloses a stabilizing and calibrating circuit for FM/CW radar systems. The approach suggested there utilizes continuous feedback to the FM oscillator to account for, and eliminate, drift in the frequency excursions of the FM waveform controlling the transmitter. A control signal is derived by, inter alia, monitoring the transmitter signal and generating a delayed signal representative thereof. This delayed signal is mixed or beat against a signal from the VCO controlling the transmitter in order to obtain a difference signal used for calibration. This difference signal, having been suitably processed, is applied through a loop to control the oscillator.

U.S. Pat. No. 4,106,020 is also concerned with the problem of undesirable changes in FM modulation waveforms for an FM/CW radar. This approach differs conceptually from the foregoing, insofar as the results of variation are compensated rather than the cause of variation (i.e., nonlinearity) being controlled. The disclosed system utilizes a target-simulating delay line and a scaling network to compensate for undesirable deviations in the modulation waveform. In part, this is achieved by applying signals representative of a target to the counting terminal of a counter while a signal representative of a simulated target is coupled to the reset terminal of the counter through a divide-by-N circuit. If the modulation waveform changes, the counter is caused to reset sooner or later by a predetermined amount of time, thereby scaling the target data appropriately, based upon errors in the peak amplitude of the modulation waveform and/or its period. While this patented system discloses a type of correction, it is one simply predicated upon a scaling factor and does not address compensation for nonlinearity in transmitter sweep frequency.

U.S. Pat. No. 3,428,898 is noteworthy as respects the network of the present invention, insofar as the system disclosed in that patent provides means for altering the data sampling rate to account for doppler effects in a satellite communication system. That approach writes data into a delay line storage device at one sample rate frequency while reading it out at a different word rate in order to compensate for doppler effects. Apart from this conceptual feature of variable time sampling to account for temporal data shift, the U.S. Pat. No. 3,428,898 patent offers little practical insight into the linearization of FM/CW radar systems.

U.S. Pat. No. 3,340,529 is interesting in its disclosure of an FM aircraft altimeter designed to reduce so-called "step errors", which arise where target range is in error by an integral number of cycles. Most remarkable about the approach suggested in this reference is that it employs an intentional impression of a nonlinear phase change to overcome this "step error" problem. Thus, as opposed to addressing the problem of nonlinearity in the transmitter frequency sweep, such nonlinearity is intentionally created.

While the aforementioned patented systems involve, to varying degrees, FM/CW ranging systems (or like instruments) and problems associated with certain instabilities thereof, none discloses or suggests the compensation for nonlinearity in transmitter frequency by linearization of the target data signal bearing target range and physical size information. Some approaches involve the attempt to control the sweep of the transmitter frequency to make it linear or as nearly so as can be achieved. To date, no known system has achieved linearity within a tolerance of less than about 0.1–0.5%. However, even as close as that may be to linearity, it remains approximately one order of magnitude too high to afford target discrimination in size and range to identify an extended target from background clutter and/or false targets. Those approaches which do not focus exclusively on efforts to conform transmitter characteristics to make its sweep linear still remain unsatisfactory to achieve the aim of target discrimination. Scaling factors or methods to avoid step error may be suitable for those applications where the system is employed as an aircraft altimeter, since it is typically the closest ground reflection from the earth's surface that is important within such a context; the discrimination of a point from an extended or false target not being an especially crucial distinction in that arena versus the guidance of a missile to a specific target.

Accordingly, the need exists to provide an improved system which begins with as linear a sweep of transmitter frequency as can be economically achieved and which then refines the data signals to compensate for residual nonlinearity which, given the current state of the art and system cost constraints, cannot be eliminated. Furthermore, the need exists to provide such an improved linearization system which yields reliable target information data permitting for range and size resolution on the order of one foot at a target range of up to 2000 feet or more.

SUMMARY OF THE INVENTION

The present invention advantageously provides a linearization network which compensates for random nonlinear variations in the transmitter frequency sweep of an FM/CW radar, and improves the capabilities thereof to an extent permitting target discrimination from background clutter and/or false targets. The network of the present invention is equally desirable for improvements in the resolution capabilities of aircraft altimeters which employ FM/CW ranging systems.

These and other advantages are realized by developing a transmitter characteristic signal representative of any nonlinearity in the frequency sweep thereof, which transmitter characteristic signal is then used to develop an error signal employed for the purpose of normalizing the raw target data signal prior to the processing thereof. In one aspect of the present invention, the transmitter characteristic signal is one based upon and derived from the phase angle of the transmitter signal over a predetermined period, which is compared with the expected phase over the same period were the transmitter operating in a linear mode (i.e., the ideal case); any phase error by virtue of nonlinear operation being employed to rotate the raw target data signal prior to processing. In an alternate approach, the transmitter characteristic signal is developed as a function of the time for a predetermined number of cycles which is then compared with the expected time for the same number of cycles were the transmitter operating in a linear condition (i.e., the ideal case); yielding a time error signal which is employed to adjust the sampling rate, advancing or retarding the same, to account for advancement or retardation due to any nonlinearity in the transmitter sweep. Yet another alternative utilizes frequency mixing of the raw target data signal with a correction signal having a frequency representative of any nonlinearity in the sweep of the transmitter signal; whereby a beat or difference frequency output is frequency normalized to account for such nonlinearities. Processing of the normalized target data signal, regardless of the linearization technique employed, is preferably achieved by a filter bank which discriminates the target data signal into a plurality of frequency bands; wherein the "instantaneous frequency" is characteristic of the range of the target and the amplitude at that frequency is characteristic of the size of the target at that range. [Although technically a misnomer, in the sense that frequency by its very definitional concept requires the consideration of a finite time period for its measurement, the term "instantaneous frequency" will be employed herein to connote for the sake of convenience the frequency of a signal over the time period of a single frequency sweep of the FM/CW radar.]

When the preferred phase rotation technique is employed to normalize the target data signal, a two channel complex signal is developed, where one signal is phase shifted by 90°, so that the vector representative of the instantaneous values of the two channels rotates in complex vector space. The error signal employed in that embodiment is one which compensates for variations in the rate of phase rotation as a function of time resulting from any nonlinearity in the sweep of the transmitter frequency. Where the alternate technique based upon temporal sampling is employed, nonlinear variations in the transmitter sweep frequency are processed as a function of time and the time error signal is employed to adjust the data sampling rate to take samples coincident with those that would be taken were the transmitter operating in a linear mode. Where the other alternate technique of frequency mixing is employed, a voltage controlled oscillator receives an input signal representative of any nonlinearity of the sweep of the transmitter frequency, thereby controlling the output frequency of the VCO signal to be indicative thereof; whereupon mixing of the raw data signal with the controlled frequency signal will result in a beat or difference frequency output signal wherein the data is normalized to eliminate spurious results arising from any nonlinear operation.

The foregoing and other advantages of the present invention will become apparent, and a fuller appreciation of the details of the network and its operation will be gained, upon an examination of the following detailed description of the invention, taken in conjunction with the figures of drawing, wherein:

DETAILED DESCRIPTION OF THE INVENTION

The present invention relates generally to FM/CW radar linearization systems and, more especially, to one which permits for target discrimination and thereby enjoys particular suitability for use in the guidance of a missile. The present invention also has broader applications, including utility in FM/CW aircraft altimeters. Accordingly, the present invention will now be described with reference to certain preferred embodiments, within the aforementioned contexts; albeit, those skilled in the art will appreciate that such descriptions are meant to be exemplary only and should not be deemed limitative.

Figure 1:
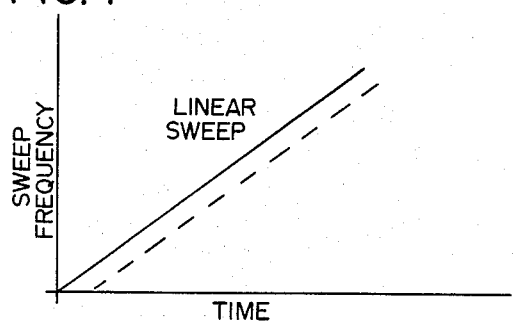
FIGS. 1 and 2 graphically illustrate the operation of an FM/CW radar system operating under linear sweep conditions.
Figure 2:
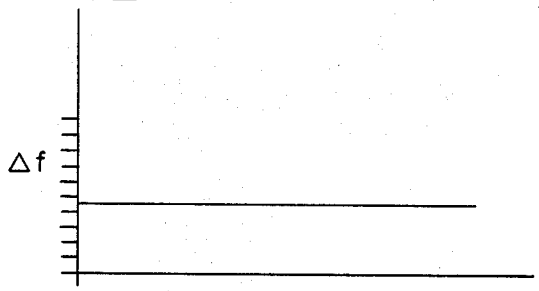

Turning to the figures of drawing, FIGS. 1 and 2 graphically illustrate the optimal operating conditions of an FM/CW radar. FIG. 1 is a graph showing transmitter frequency versus time, as the solid line, and the reflected or receiver signal as a dashed line. Under these ideal conditions, where the frequency of the transmitter is swept linearly, the mixing of the transmitter and receiver signals will result in a single value beat frequency, shown in FIG. 2. The value of that frequency is a direct indication of the range of the target responsible for the reflected or received signal. When scanning a particular area with an eye toward target discrimination through interrogation by the individual sweeps of the transmitter signal, detection of the reflected signal provides detailed information about the range and physical size of that target. Each sweep will yield a target data signal, wherein the frequency is determinative of the range to that target and the amplitude of that signal is determinative of the physical size thereof at that range. This makes theoretically possible the discrimination of a specific target, differentiating it from background clutter such as trees or the like as well as false targets such as so-called "corner reflectors" put in place for evasive purposes. More specifically as respects these corner reflectors, the same present a relatively large surface area for reflection of the interrogation signal which, upon processing, will give the appearance of a substantial target. While possessing significant transverse dimensions as respects the transmitted signal, the projection of such targets along the line of propagation is usually quite short. Accordingly, the ability to discriminate physical size as well as location fosters the further ability to discriminate an actual target from such a false or spurious one. Hence, the ability to ascertain with some precision both range and physical size on the basis of reliable return data signals becomes crucial, especially, for missile guidance.

Whereas the point target results in the monofrequency data signal as described above, a true extended target will give rise to a multiple frequency data signal of varying amplitude; which may be viewed (or analyzed) for the sake of convenience as a continuum of point targets. In this manner of interpretation, incremental frequency differences or bands $\Delta f$ correspond to incremental range differences $\Delta x$ along the line of propagation of the transmitter signal; still maintaining the relationship of signal amplitude within a given band $\Delta f_i$ as a measure of the physical size of the target over the correlative range increment $\Delta x_i$. Background clutter is distinguishable on the basis of low level returns in individual frequency bands $\Delta f$. Likewise, false targets such as corner reflectors, although giving rise to significant returns at the range of the reflective surface, will be distinguishable by low level returns at further, relatively close range increments beyond the position of that surface. Thus, FM/CW radar systems are theoretically adaptable to achieve the important goal of target discrimination.

Figure 3:
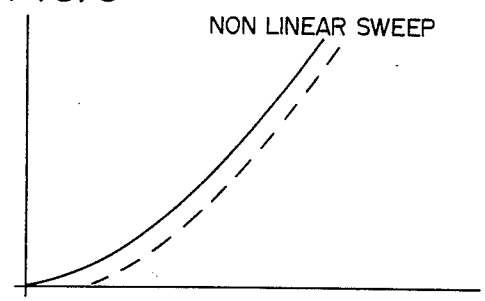
FIGS. 3 and 4 graphically illustrate the operation of an FM/CW radar operating under nonlinear sweep conditions.
Figure 4:
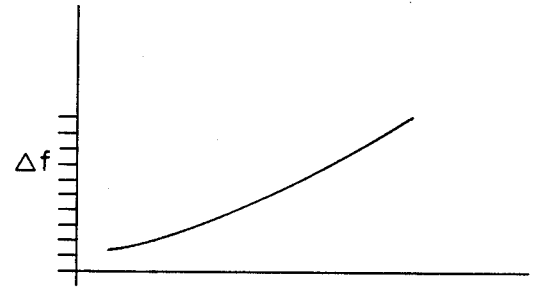

Were conventional FM/CW radar systems to operate in the field in accordance with theory, as represented in FIGS. 1 and 2, such range and size discrimination would be an easy task. However, practical systems do not reach these idyllic conditions given the current state of the art. Typically, the transmitter sweep is not perfectly linear and the deviations from such linear conditions can occur randomly; albeit usually at a relatively slow rate. FIGS. 3 and 4 illustrate graphically one situation where the transmitter frequency is swept nonlinearly, giving rise to a beat or difference frequency which varies as a function of time (as represented in FIG. 4). As opposed to the ideal situation represented in FIG. 2, a single point source now gives rise to a multiple frequency return otherwise indicative of an extended target as seen in FIG. 4.

Figure 5:
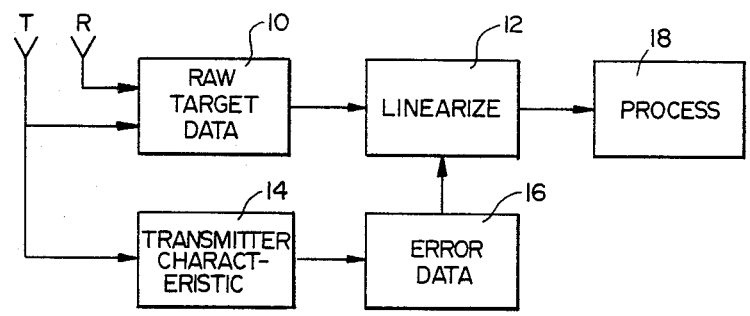
FIG. 5 is a simplified block diagram of a linearization network for an FM/CW radar, in accordance with the present invention.

The present invention departs from prior approaches to resolve the dilemma of nonlinear operation of FM/CW radar systems; those earlier attempts focusing on control of the transmitter to strive for linear operation. Those approaches have resulted in a control of linearity to within about 0.1–0.5%. While many significant strides have been made to achieve this level of control, at least one order of magnitude improvement is necessary if an FM/CW radar is to be employed in association with a missile to achieve precise target discrimination. The present invention achieves that order of magnitude improvement. But, rather than attempting to refine further a control on the transmitter side of the system, the present invention tolerates nonlinearity and accommodates the inability to achieve perfect linearity by compensating in the processing of the data signal to factor out spurious results and thereby frequency normalize the target data signal for accurate processing. FIG. 5 illustrates, in a simplified block diagram, the overall operational characteristics of a linearization network in accordance with the present invention.

A circuit for developing raw target data, designated as 10, receives transmitter and receiver signals, identified as "T" and "R", respectively. The circuitry 10 processes the incoming signals to yield a difference signal which is applied as an input to a linearizing circuit 12. For the sake of illustration, the raw target data signal may be assumed to be similar to that illustrated in FIG. 4; wherein a single point target gives rise to a multiple frequency return as the consequence of nonlinear sweep of the transmitter frequency. A transmitter characteristic circuit 14 develops a signal representative of the nonlinearity in the transmitter frequency sweep. For present purposes, the transmitter sweep may be monitored with an eye toward detecting nonlinear operation by sampling in respect of the phase of the transmitter signal at precise times or by sampling in respect of the time for a given number of cycles in the interrogation signal. In either event, whether the focus be on phase or time, the parameter will be indicative of the linearity vel non of the sweep. An error data circuit 16 receives the output from the transmitter characteristic circuit 14 and generates an error signal, whether it be one as a function of phase or temporal deviations, which serves as an input to the linearizing circuitry 12. Linearizing the input data to effect frequency normalization may be achieved in any one of a number of ways. The raw target data applied to the linearizing circuit 12 is preferably phase rotated therein to account for nonlinearity in the transmitter sweep; although that data might equally well be processed by a temporal shifting in data sampling rate to coincide with that which would have been the case were the transmitter swept linearly; or the data signal might be mixed with a frequency correction signal variable as a function of time and having a frequency variation which accounts for transmitter frequency sweep nonlinearity to achieve a difference or beat signal thereby frequency normalized as respects the raw data signal. In any event, the normalized target data is now applied to a processing circuit 18 which is capable of splitting the normalized signal into a plurality of frequency bands, the frequency of any given band being indicative of the range of the target and the amplitude of the signal within the band being indicative of the size of the target at that range.

The most preferred technique for achieving this normalization of raw target data is one which detects transmitter frequency sweep nonlinearity as a function of phase shift in the transmitter frequency from that which would be expected were the sweep of frequency linear. This gives rise to a phase error which can be employed to phase rotate raw target data and thereby frequency normalize the same. In order to achieve the phase rotation of this preferred technique, it will normally be necessary to employ a complex channel FM/CW radar, which utilizes two signals in quadriture with one another. This, in turn, gives rise to a complex vector representative of the target data, best discussed with reference to FIG. 6.

Figure 6:
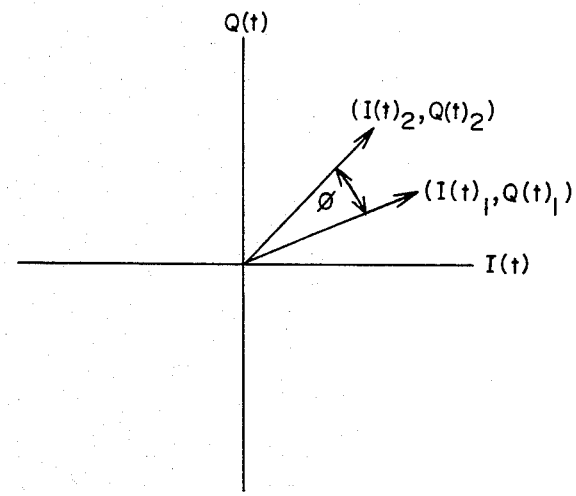
FIG. 6 graphically illustrates the manner in which a two-channel data signal vector rotates during operation of an FM/CW radar system.
Figure 7:
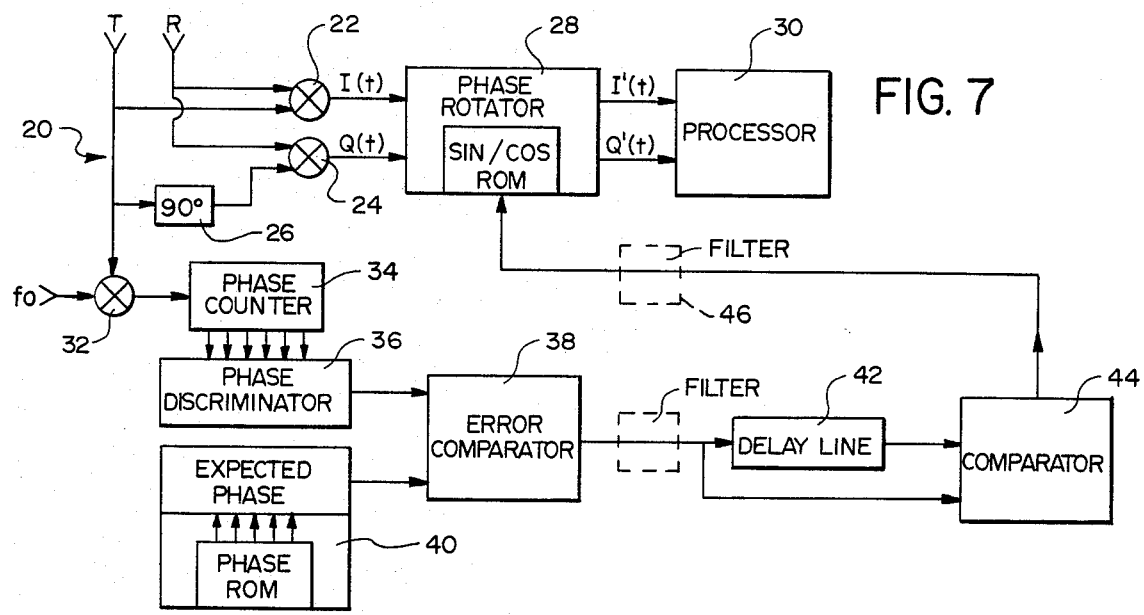
FIG. 7 is a block diagram of one embodiment of a linearization network in accordance with the present invention, wherein linearization is achieved by phase rotation.

FIG. 6 graphically illustrates the progression of a complex vector $(I(t)_n, Q(t)_n)$ which rotates in the vector space $I(t)$, $Q(t)$, representative of the two aforementioned channels of the FM/CW radar. At a first time $t_1$, the vector is shown as $(I(t)_1, Q(t)_1)$ which rotates at time $t_2$ to $(I(t)_2, Q(t)_2)$. The angle of rotation for the vector between the times $t_1$ and $t_2$ is given as $\phi$. Were the radar transmitter frequency swept linearly, the rate of change of the phase angle $\phi$ (i.e., the rotation of the phase angle) for a single point target would be constant. Any deviations from linearity will be manifested as a deviation in the rate of change of this angular relationship. Detecting the phase relationship of the transmitter signal and generating an error signal in response thereto, proportional to any nonlinearity, allows the linearization of raw target data by applying a suitable phase rotation to the raw target data in order to conform the phase angle $\phi$ to that which would be observed were the transmitter operating in a linear fashion, i.e., advancing or retarding the phase angle to alter its rate as required to maintain it effectively constant, corresponding to linear operation. FIG. 7 exemplifies one network to achieve that aim.

FIG. 7 illustrates a network designated generally as 20 which receives transmitter and receiver signals identified as T and R, respectively. Raw target data is first developed by obtaining the difference frequency between transmitter and receiver signals. A pair of mixers 22 and 24 are employed for this purpose. Mixer 22 receives both the transmitter and receiver signals and generates a beat or difference frequency between the two to yield raw target data characteristic of the range and physical size of a given target. Likewise, mixer 24 is employed to develop a similar raw target data signal, but one where the transmitter signal is first phase shifted by 90° in a phase shift circuit 26. Accordingly, as respects the vectorial representation of FIG. 6, the output of mixer 22 corresponds to a signal $I(t)$ while the output of mixer 24, having previously had the transmitter signal shifted, corresponds to $Q(t)$. These two signals are applied to a phase rotator 28 which is employed to alter the phase angle $\phi$ between the signals $I(t)$ and $Q(t)$ to yield normalized signals $I'(t)$ and $Q'(t)$ which are applied to a processor 30.

The phase angle error signal utilized to effectuate phase rotation in circuit 28 is developed by measuring the phase over a given number of cycles for the transmitter signal and comparing that phase relationship to the expected one for the same time period were the transmitter operating linearly. As a typical transmitter frequency is in the 50 GHz range, and will vary perhaps over the range of 50–51 GHz, it is desirable if not essential to reduce that frequency to one more easily manipulated with conventional counters or scalers. Accordingly, the transmitter signal is applied to a mixer 32 in which it is beat with a reference signal $f_o$ to yield a beat frequency more easily processed. For example, when the transmitter is operating at about 50–51 GHz, a reference frequency of about 49.9 GHz is advantageously employed to yield a transmitter characteristic signal having a reduced frequency in the range of from about 0.1–1.1 GHz, but one which preserves any nonlinear variations in the sweep. This transmitter characteristic signal is applied to a phase counter or scaler 34 capable of counting, preferably, one-half cycle increments. The phase at times $t_n$ is measured in a phase discriminator 36 which counts these cycles over a precise, known time interval. This measured phase signal is applied as a first input to an error comparator 38. A phase ROM (Read Only Memory) 40 provides an accurately calibrated comparison signal representative of the expected phase increments at the same times $t_n$, this signal comprising a comparison input to the error comparator 38. The error comparator then develops a phase angle error signal characteristic of the nonlinearity of the transmitter. The phase angle error signal is delayed in a time delay circuit 42 having a delay equal to the propagation time (i.e., the travel time to the target). The delayed error signal is compared with the error signal itself in a comparator 44 which provides a normalized phase error signal to be used for phase rotation of the data signal inputs in phase rotator 28. Preferably, the phase error signal is filtered in a filtering network 46, shown in phantom lines in FIG. 7. Since it is expected that the deviations in linearity for which compensation is necessary are rather gradual ones, the purpose of filter 46 is to eliminate any spurious, momentary variations (e.g., a spike on the transmitter signal). The filtering of the phase error signal may be achieved at any convenient stage in the network and, accordingly, filter network 46 might precede the delay line 42 or the phase rotation circuit 28.

The phase error signal is applied to the phase rotation circuitry 28 to effect mathematical normalization of the data signal and thereby account for errors due to nonlinear frequency sweep. The relationship between the phase corrected data signal and the input data signal I(t), Q(t) is as follows:

$$I'(t) = \cos\phi I(t) + \sin\phi Q(t),$$

$$Q'(t) = \sin\phi I(t) - \cos\phi Q(t).$$

A ROM element in the circuit 28 receives the phase error signal $\phi$ and effects the cosine $\phi$, sine $\phi$ look-up which is then used in the mathematical manipulation in order to normalize the raw target data and provide the outputs I'(t) and Q'(t) which are applied to the processor 30.

The processor 30 is designed to discriminate the input signals in order to present range and size information respecting the target. In a preferred form, the processor 30 is a filter bank which separates the input data into a plurality of frequency bands. Each band corresponds, in frequency, to the range of the target while the amplitude of the signal within that band corresponds to the size of the target at that range. As the input signal to processor 30 has undergone the appropriate phase rotation dictated by the nonlinearity of the transmitter frequency sweep, the output from processor 30 is a very accurate indication of the range and size of the target. Any "spreading" of the frequency due to nonlinearity of the transmitter, as is represented in FIGS. 3 and 4, is normalized so that the processor 30 is receiving data signals approximating those in FIG. 2. It has been determined that this technique reduces error resulting from nonlinear operation by approximately one order of magnitude. Accordingly, a radar system employing a transmitter feedback loop which is capable of maintaining linearity at about 0.5% will, when associated with the linearization network 20, give results comparable to deviations of only about 0.05%. When utilizing a transmitter frequency on the order of 50 GHz, this provides range resolution on the order of about one foot at a target range of about 2000 feet. This type of sensitivity in resolution permits the discrimination of a target from background clutter, and even from false targets such as corner reflectors.

Figure 8:
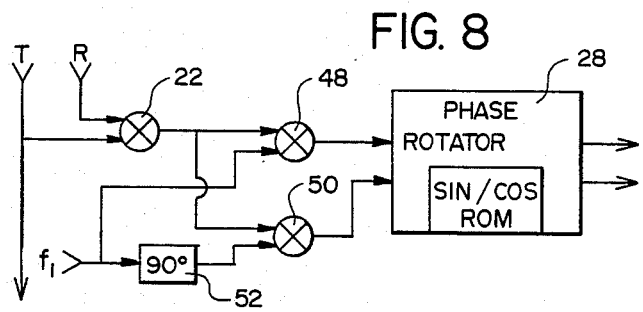
FIG. 8 is a block diagram of an alternate, preferred phase rotator for use in conjunction with the linearization network illustrated in FIG. 7.

FIG. 8 shows an alternate embodiment for the target data circuitry providing input to the phase rotator 28. As noted above, the transmitter oftentimes operates at very high frequency; this being desirable for better target resolution. The high frequency operation results in the need to mix the transmitter frequency downwardly in order to achieve proper phase counting in transmitter characteristic circuit 34 of FIG. 7. Likewise, it is sometimes desirable to mix the data signal down in frequency prior to phase rotation.

As with the embodiment of FIG. 7, a first mixer 22 provides a difference or beat frequency between the transmitter and receiver signals. This data signal is applied as a first input to each of two mixers, identified as 48 and 50. A standard frequency $f_1$ is applied as the second input to these mixers 48 and 50 to reduce the frequency of the data signals applied to phase rotator 28. In order to achieve the phase shift necessary to establish the complex vectorial relationship between the signals I(t) and Q(t), a 90° phase shifting network 52 is interposed between the output of the standard reference frequency $f_1$ and the input to mixer 50. The inputs to the phase rotator 28 will be completely comparable to those data signals developed at the front end of the network in FIG. 7; save the fact that the frequency of the data signals emanating from mixers 48 and 50 will be reduced on account of the mixing frequency $f_1$. In this instance, the processor 30 will be calibrated to take into account this lower frequency in the data signal but, otherwise, the linearization network operates in the same manner described above.

Figure 9:
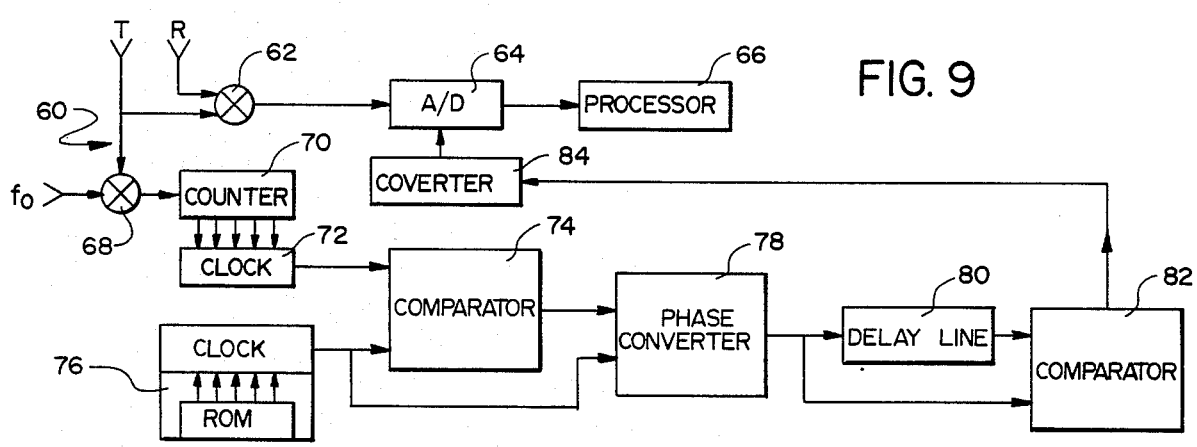
FIG. 9 is a block diagram of an alternate embodiment of a linearization network in accordance with the present invention, wherein linearization is achieved by adjusting the temporal rate of sampling the data signal; and, FIG. 10 is a block diagram of yet another alternate embodiment of a linearization network in accordance with the present invention, wherein linearization is achieved by frequency mixing.

FIG. 9 illustrates an alternate embodiment for the linearization of an FM/CW radar. As opposed to the embodiments described above with reference to FIGS. 7 and 8, wherein linearization is achieved by phase rotation of the target data signal, the technique employed in the network of FIG. 9 normalizes the data by time-shifting the sampling rate; thereby effectively eliminating deviations in data information resulting from nonlinear operation of the transmitter. In other words, variations due to nonlinearity in the transmitter frequency sweep are viewed as a temporal advancement or retardation. Thus, if nonlinearity were to make a target appear to be further in range, the time equivalent of that range disparity is compensated by sampling the target data signal at an earlier time; normalizing the data signal in that fashion.

The network for linearizing the target data signal, illustrated generally as 60 in FIG. 9, develops the target data signal by applying the transmitter and receiver signals to a mixer 62, comparable to mixer 22 in FIG. 7. Mixer 62 develops a frequency difference signal wherein the frequency is indicative of range and the amplitude at a given frequency indicative of the size of the target at that range. The signal is applied to a linearization circuit 64 which, in this case, is shown to be an analog-to-digital converter. Those skilled in the art will appreciate that the use of such an A/D converter is one of design option; for the signal can equally accurately be processed as an analog one. Digitized data information is applied as an input to a processor 66 which, as with processor 30 in FIG. 7, achieves target discrimination from clutter or false targets, the interrelationship of the converter 64 and processor being described more fully hereinbelow.

The transmitter characteristics are determined by first mixing down the transmitter frequency in a mixer 68, which receives a standard frequency against which to beat the transmitter signal. Accordingly, a transmitter characteristic data signal of lower frequency but replicating the transmitter characteristics, including any nonlinearity, is developed and applied to a timing circuit 70. The timing circuit 70 is preferably a counter which measures a given number of cycles in the transmitter characteristic signal. For example, the counter might sample the signal emanating from mixer 68 for, e.g., 64 cycles and, once that number of cycles had been counted, measure the time for that occurrence. That time is measured by a clock 72 and applied as a first signal to a comparator 74. A ROM/clock circuit 76 provides a calibrated output of the calculated or expected time for the occurrence of the same number of cycles counted in counter 70, were the transmitter frequency swept linearly, which is applied as the second input to the comparator 74. The measured and expected times for the established cycle are compared and a time error signal developed, which is applied as a first input to a phase converter 78. The phase converter 78 also receives an input from the ROM/clock 76 in order to obtain an equivalent phase error by multiplying the time errors by the instantaneous frequency as it varies with time. This phase error signal is applied to a delay line 80 and then a comparator circuit 82 which also receives an undelayed phase error signal; so that the current phase error is subtracted from the phase error that existed at an earlier time t corresponding to the propagation time or range to the target. The time-adjusted error signal is then applied to a converter 84 to develop a sampling signal to control the sampling time of the target data by the A/D linearizing circuit. This interval control signal adjusts the sampling rate of the converter in order to adjust the temporal processing of target data responsive to the time error resulting from any nonlinear operation of the transmitter. The normalized data is then applied to processor 66 which analyzes the data to present information on target range and size. As with the embodiment discussed above in reference to FIG. 7, the processor 66 is most preferably a filter bank which discriminates the normalized data into a plurality of frequency bands, the frequency being indicative of target range and the amplitude at that frequency being indicative of the target size at that range.

At this juncture, it should be appreciated by those skilled in the art that the exemplary embodiments described in detail above admit of certain cross permutations to suit the desires or demands of a given application. More specifically, each embodiment may be distilled to a transmitter sensing portion and a data correcting portion. In one instance the sensing is made in respect of a phase angle error indicative of any nonlinearity in the frequency sweep of the transmitter; while an alternate approach is in respect of a temporal deviation indicative of any nonlinearity in the frequency sweep of the transmitter. On the other hand, data correction is achieved in one aspect by phase rotation of input data whereas the same goal is achieved in another aspect by time-shifting the data sampling rate. However, within the broad ambit of the present invention, it is equally well possible, and under some circumstances perhaps desirable, to sense the transmitter characteristics on the basis of its phase error while the data correction is based on an alteration in the time-sampling rate to achieve frequency normalization. Vice versa, one might to equal advantage elect to make a sampling on the basis of temporal variations while effectuating data correction by phase rotation in response to those deviations.

Considering initially the first permutation—phase sensing with temporal correcting—the transmitter characteristic portion of the circuitry illustrated and described with reference to FIG. 7 would be an advantageous approach. The transmitter signal, having been suitably reduced in frequency for ease of processing through a phase counter and phase discriminator, would be compared against the phase expected were the frequency of the transmitter to have been swept linearly. A phase error signal developed in an error comparator would subsequently be subjected to correction through a delay line and applied to a comparator/-converter network, such as the one identified in FIG. 9 (i.e., 82, 84). Upon that processing, a signal comparable to that emanating from converter 84 will be produced, suitable for application to an analog-to-digital converter receiving raw data input signals; the phase error signal having suitably been converted to a time-sampling signal for effectuating an adjustment in the temporal sampling rate of the A/D converter to achieve frequency normalization in the manner described with reference to the embodiment of FIG. 9.

Addressing next the latter permutation, it may be equally advantageous to sense nonlinearity in the frequency sweep of the transmitter as a time error signal in the manner illustrated and described with reference to the embodiment of FIG. 9 and yet achieve data correction by phase rotation in the manner illustrated and described with reference to the embodiment of FIG. 7. In such a case, the transmitter characteristic circuitry of FIG. 9 will be employed. The transmitter signal, suitably reduced in frequency but nonetheless replicating the characteristics of the signal, will be applied to a counter which will, in combination with a clock, generate a signal indicative of the time period for a predetermined number of cycles. This will be compared with the time expected were the frequency of the transmitter to have been swept linearly, thereby yielding an error signal. The error signal is then converted to a phase signal by multiplying the time errors by the "instantaneous frequency" as it varies with time, as was achieved by phase converter 78. The phase error signal is then subjected to a delay and comparison with itself in the manner described above, and the adjusted phase error signal, comparable to that emanating from comparator 44 in the embodiment of FIG. 7, may then be utilized to rotate the phase of the raw data in a phase rotation circuit the same as circuit 28 described with reference to FIG. 7.

Accordingly, the linearization network of the present invention is widely adaptable to meet the exigencies of the task at hand. All manner of variation may be employed; providing alternatives to the approach in sensing the linearity vel non of the frequency sweep of the transmitter, the processing of that characteristic signal as a desirable error signal, and the application of that error signal to correct raw target data with an eye toward frequency normalization prior to processing. Given the foregoing teachings and illustrative alternatives, those skilled in the art may readily apply themselves to the suitable selection of those sensing/processing correction techniques as may fit the task at hand.

Figure 10:
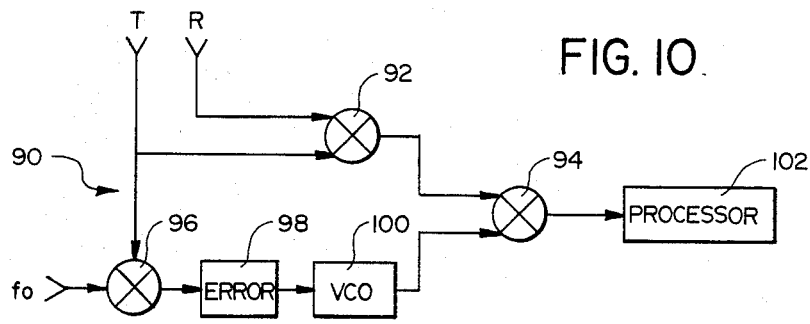

The considerable breadth of the invention described above may be refined to yet another specific embodiment within the ambit of the present invention. A simplified diagram of that alternative approach is illustrated in FIG. 10. The network of FIG. 10, designated generally as 90, comprises a first mixer 92 receiving both the transmitter and receiver signals in the same manner described with reference to the preceding embodiments; thereby developing as an output a raw target data signal requiring frequency normalization in order to achieve target discrimination. The raw data signal is applied as a first input to a linearizing mixer 94. The transmitter signal is also applied to a network for providing a transmitter characteristic data signal. This network is comprised of a transmitter characteristic mixer 96 which receives as a first input the transmitter signal and as a second input a standard frequency signal $f_o$; wherein the two signals are beat to develop a reduced-frequency characteristic signal replicating the transmitter signal and indicative of any nonlinearity in the sweep of its frequency. This reduced-frequency signal is applied to an error network 98 to develop an error signal proportional to any deviations from linearity in the operation of the transmitter. The error signal emanating from circuitry 98 is used to control the output of a voltage controlled oscillator (VCO) 100. Errors which represent either an advancing or lagging sweep, departing from the ideal case of linearity, will effectuate a corresponding output in the frequency of the signal developed in the VCO 100. This output signal, a direct representation of any nonlinearity, is employed as the second input to the correcting mixer 94. When the raw data signal is beat against the correcting signal in the mixer 94, an output is achieved which is frequency normalized for analysis in processor 102, like the processors 30 and 66 described with reference to the embodiments of FIGS. 7 and 9, respectively.

In this approach, the error signal will vary in response to any nonlinearity to provide an output from the VCO having a frequency variation the same as the frequency variation (or spreading) of the raw target signal caused by nonlinearity so that mixing the two will yield a normalized signal. In other words, and looking again to FIGS. 3 and 4, nonlinearity in sweep results in a spurious, variable frequency return giving rise, in turn, to an observation of a point source seemingly as an extended target. However, mixing the data signal of FIG. 4 with one having the same frequency spreading characteristics to account specifically for the effects of nonlinearity in the former will give rise to a monofrequency data signal like that of FIG. 2, which can now be processed to accurately reflect the source as a point target (or, conceptually, an extended target as a continuum thereof). The error circuitry 98 and VCO 100 provide this correction signal for mixing with the raw target data signal in mixer 94 to achieve this normalization prior to analysis in processor 102.

As is now evident from the foregoing description of preferred embodiments, the linearization network of the present invention (in any of its alternative forms) accurately and reliably normalizes the operation of an FM/CW radar, accounting for random variations in nonlinearity of the sweep of the transmitter frequency in the processing of the return data signal to eliminate erroneous or spurious results. Both improved range resolution and target discrimination are thereby achieved. Accordingly, the advantages of FM/CW radar, including continuous interrogation of a target zone and ease of processing, are maintained while the inherent limitations on range resolution and target discrimination are effectively overcome.

While the invention has now been described with reference to certain preferred embodiments thereof, those skilled in the art will appreciate that various substitutions, modifications, changes and omissions may be made without departing from the spirit thereof. Hence, it is intended that the scope of the present invention be limited solely by that of the claims granted herein.

What is claimed is:

1. An FM/CW radar linearization network compensating for random variations in the linearity of the frequency sweep of the radar transmitter in the processing of the radar receiver signal characteristic of the range and physical size of a target to provide target identification data discriminating said target from background reflections, said network comprising:

a. raw target data generating means for developing a target data signal containing frequency un-normalized target identification information, wherein the instantaneous frequency of said target data signal is characteristic of the range of a target and the amplitude of said target data signal is characteristic of the size of said target at that range;
   b. transmitter characteristic data generating means for developing a sampling signal containing transmitter frequency sweep information;
   c. error data generating means receiving said sampling signal for developing an error signal characteristic of any nonlinearity in the sweep of the transmitter frequency; and,
   d. linearization means receiving said raw target data signal and said error signal for frequency normalizing target identification information by compensation for any random variation in the linearity of the sweep of transmitter frequency.

2. The linearization network of claim 1, wherein said raw target data generating means comprises a transmitter/receiver frequency comparator means for developing a target data frequency signal characteristic of the size and range of said target.

3. The linearization network of claim 2, wherein said transmitter/receiver frequency comparator means is comprised of a first transmitter/receiver frequency comparator means for developing a first target data frequency signal characteristic of the size and range of said target, said network further comprising second transmitter/receiver frequency comparator means for developing a second target data frequency signal characteristic of the size and range of said target rotated from said first target data frequency signal through a predetermined rotation angle.

4. The linearization network of claim 3, wherein said error data generating means comprises phase angle comparator means for developing a phase error signal characteristic of any phase angle deviation in the sweep of transmitter frequency resulting from random nonlinear variations thereof.

5. The linearization network of claim 4, wherein said linearization means comprises phase angle rotation means receiving said first and second target data frequency signals and said phase error signal, for rotating the phase angle between said target data frequency signals by a value proportional to said phase error signal to frequency-normalize said target data signal by compensation for random nonlinear variations in said transmitter frequency sweep and developing a normalized target signal.

6. The linearization network of claim 5, wherein said network further comprises target data processing means receiving said normalized target signal for frequency discrimination thereof into a plurality of frequency bands characteristic of the size and range of said target.

7. The linearization network of claim 6, wherein said target data processing means comprises filter means for discriminating said normalized target signal into a plurality of frequency bands, wherein each frequency band is characteristic of the range of said target and the signal amplitude within each band is characteristic of the size of said target.

8. The linearization network of claim 6, wherein said phase angle rotation means receives a first raw target data signal I(t) and a second raw target data signal Q(t) identical to said first signal rotated through an angle of 90° and further wherein the vector representation of said raw target data signals (I(t), Q(t)) rotates through a phase angle $\phi$; said phase angle rotation means comprising a sin/cos ROM element receiving said phase error signal and means for correcting said raw target data and frequency normalizing the same in response thereto to yield a normalized target data signal (I'(t), Q'(t)) in accordance with the relationships:

$$I'(t) = \cos \phi I(t) + \sin \phi Q(t),$$

$$Q'(t) = \sin \phi I(t) - \cos \phi Q(t).$$

9. The linearization network of claim 1, wherein said error data generating means comprises phase angle comparator means for developing a phase error signal characteristic of any phase angle deviation in the sweep of transmitter frequency resulting from random nonlinear variations thereof.

10. The linearization network of claims 1 or 2, wherein said error data generating means comprises transmitter signal time comparator means for developing a time error signal characteristic of any time deviation of said transmitter signal over a predetermined cycle sample count resulting from random nonlinear variations in said transmitter frequency sweep as compared with the period for the same number of cycles were the frequency sweep linear.

11. The linearization network of claim 10, wherein said linearization means comprises raw target data signal time sampling means receiving said raw target data signal and said time error signal, wherein the sampling time of said signal time sampling means is advanced or retarded by a value proportional to said time error signal to normalize said target data signal by compensation for random nonlinear variations in said transmitter frequency sweep and develop a normalized target signal.

12. The linearization network of claim 9, wherein said network further comprises target data processing means receiving said normalized target signal for frequency discrimination thereof into a plurality of frequency bands characteristic of the size and range of said target.

13. The linearization network of claim 10, wherein said target data processing means comprises filter means for discriminating said normalized target signal into a plurality of frequency bands, wherein each frequency band is characteristic of the range of said target and the signal amplitude within each band is characteristic of the size of said target.

14. The linearization network of claim 10, wherein said linearization means comprises an analog-to-digital converter.

15. The linearization network of claims 1 or 2, wherein said error data generating means comprises a voltage controlled oscillator for developing an error signal, the frequency of which varies proportionately to any nonlinearity in the sweep of said transmitter frequency.

16. The linearization network of claim 15, wherein:
 a. said raw target data means includes a target data mixer means for developing said target data signal; and,
 b. said linearization means comprises a linearization mixer receiving said target data signal and said error signal from said oscillator.

17. The linearization network of claim 16, further comprising target data processing means receiving a normalized target data signal from said linearization mixer for frequency discrimination thereof into a plural-ity of frequency bands characteristic of the size and range of said target.

18. The linearization network of claim 17, wherein said target data processing means comprises filter means for discriminating said normalized target signal into a plurality of frequency bands, wherein the frequency of each band is characteristic of the range of said target and the signal amplitude within each band is characteristic of the size of said target.

19. An FM/CW radar linearization network compensating for random variations in the linearity of the frequency sweep of the radar transmitter in the processing of the radar receiver signal characteristic of the range and physical size of a target to provide target identification data discriminating said target from background reflections, said network comprising:
 a. first transmitter/receiver frequency comparator means for developing a first target data signal I(t), the instantaneous frequency of which is characteristic of the range of said target and the amplitude of which is characteristic of the size of said target at that range;
 b. second transmitter/receiver frequency comparator means for developing a second target data signal Q(t) identical to said first target data signal rotated through a 90° angle;
 c. transmitter characteristic data generating means for developing a sampling signal characteristic of the transmitter sweep frequency;
 d. phase counter means receiving said sampling signal for developing a measured phase signal representative of the phase of said transmitter frequency at preselected sampling times;
 e. signal generating means for developing a comparison signal characteristic of the phase of a transmitter operating under linear frequency sweep conditions at said preselected times;
 f. phase error comparator means receiving said measured phase signal and said comparison signal for developing a phase error signal characteristic of any phase error in said transmitter frequency sweep resulting from nonlinear operation thereof; and,
 g. phase angle rotation means receiving said first and second target data signals and said phase error signal for rotating said first and second target data signals, I(t) and Q(t), respectively, by an error angle represented by said phase error signal to yield frequency normalized target data signals I'(t) and Q'(t), respectively, in accordance with the relationships:

$$I'(t) = \cos \phi I(t) + \sin \phi Q(t),$$

$$Q'(t) = \sin \phi I(t) - \cos \phi Q(t).$$

20. In an FM/CW radar system, wherein a transmitter signal and a receiver signal are mixed to yield a target data signal having a frequency spectrum the instantaneous frequency of which is representative of the range of a target and the amplitude of which at said instantaneous frequency is representative of the size of said target at said range, wherein said system is subject to operation over a random nonlinear sweep of transmitter frequency, the improvement comprising a linearization network compensating for nonlinearity, said network comprising:

a. transmitter/receiver mixer means for developing a complex, two channel target data signal represented vectorially as $(I(t)_n, Q(t)_n)$ for times $t_n$, wherein the vector rotates at times $t_1, t_2, t_3 \ldots$ at a constant angular rate under linear transmitter sweep frequency conditions;

b. phase error means receiving a sampling signal characteristic of the linearity of said transmitter sweep for developing a phase error signal proportional to any nonlinearity in sweep frequency at times $t_n$; and, c. phase rotation means receiving said target data signal and said phase error signal for rotating said vector by an amount proportional to any phase error to maintain said angular rate constant.

21. The linearization network of claim 20, wherein said phase error means is comprised of a phase counter for detecting the phase of said transmitter frequency over a predetermined time period and developing a measured phase signal characteristic thereof, a phase comparison signal generator for developing a comparison signal characteristic of the phase of a transmitter operating under linear sweep conditions and a comparator receiving as inputs said measured phase signal and said phase comparison signal for developing a phase error signal proportional to the difference between said inputs.

22. The linearization network of claims 20 or 21, wherein said transmitter/receiver mixer means is comprised of a first transmitter/receiver mixer receiving transmitter and receiver signals and developing a first target data signal and a second transmitter/receiver mixer receiving transmitter and receiver signals, one of which is phase shifted in a phase shifting circuit to develop a second target data signal, rotated 90° from said first target data signal.

23. The linearization network of claim 22, further comprising a transmitter mixer receiving said transmitter signal and a standard frequency signal for developing a low-frequency transmitter characteristic data signal characteristic of the sweep frequency of said transmitter.

24. The linearization network of claims 20 or 21, wherein said transmitter/receiver mixer means is comprised of a mixer network including a first transmitter/receiver mixer receiving transmitter and receiver signals and developing a first target data signal, a second transmitter/receiver mixer receiving said first target data signal and a standard frequency signal for developing a first low-frequency target data signal, and a third transmitter/receiver mixer receiving said first target data signal and said standard frequency signal, one of which is phase shifted, to develop a second low-frequency target data signal rotated from said first low-frequency data signal by 90°.

25. The linearization network of claim 24, further comprising a transmitter mixer receiving said transmitter signal and a standard frequency signal for developing a low-frequency transmitter characteristic data signal characteristic of the sweep frequency of said transmitter.

26. In an FM/CW radar system, wherein a transmitter signal and a receiver signal are mixed to yield a target data signal having a frequency spectrum the instantaneous frequency of which is representative of the range of a target and the amplitude of which at said instantaneous frequency is representative of the size of said target at said range, wherein said system is subject to operation over a random nonlinear sweep of transmitter frequency, the improvement comprising a linearization network compensating for nonlinearity, said network comprising:

a. transmitter/receiver mixer means for developing a raw target data signal;

b. transmitter characteristic data mixer means receiving said transmitter signal and a standard frequency signal for developing a transmitter characteristic signal representative of the transmitter sweep;

c. counter means receiving said transmitter characteristic signal for counting a predetermined number of cycles thereof and developing a measured time signal proportional to the time period of said predetermined number of cycles;

d. comparison signal means for developing a time comparison signal proportional to the time expected for said predetermined number of cycles were the transmitter frequency sweep linear;

e. comparator means receiving the measured and expected time signals and developing a time error signal proportional to the difference thereof;

f. phase converter means receiving said time error signal and a signal proportional to the instantaneous frequency expected for linear operation, for developing a phase error signal representative of any nonlinearity in the sweep of transmitter frequency;

g. converter means for converting said phase error signal to a sample interval control signal;

h. linearizing means receiving said raw target data signal and said sample interval control signal, wherein the latter adjusts the sampling time of said raw data signal by a time proportional to any error due to nonlinearity in said sweep, thereby normalizing said target data signal; and, i. processing means receiving the normalized target data signal for discriminating said normalized signal into a plurality of frequency bands, wherein the instantaneous frequency of each band is characteristic of the range of said target and the amplitude at said instantaneous frequency is characteristic of the size of said target at said range.

27. The linearization network of claim 26, wherein said linearizing means is an analog-to-digital converter, the sampling rate of which is adjusted in response to said interval control signal.

28. An FM/CW radar linearization network compensating for random variations in the linearity of the frequency sweep of the radar transmitter in the processing of the radar receiver signal characteristic of the range and physical size of a target to provide target identification data discriminating said target from background reflections, said network comprising:

a. a transmitter/receiver mixer means receiving transmitter and receiver signals and developing a raw target data signal as an output thereof;

b. a transmitter characteristic mixer means receiving said transmitter signal and a reference signal and developing a transmitter characteristic signal as an output thereof;

c. an error data generating means receiving said transmitter characteristic signal and developing an error signal characteristic of any nonlinearity in the sweep of the transmitter frequency;

d. a voltage controlled oscillator receiving said error signal and developing a linearizing signal as an output thereof, having a frequency variation proportional to any nonlinearity in said sweep; and, e. a linearizing mixer receiving said raw target data signal and said linearizing signal for developing a frequency-normalized target data signal as an output thereof.

29. The linearization network of claim 28, further comprising target data processing means receiving said normalized target data signal for frequency discrimination thereof into a plurality of frequency bands.

30. The linearization network of claim 29, wherein said target data processing means comprises filter means for discriminating said normalized target signal into a plurality of frequency bands, wherein the frequency of each band is characteristic of the range of said target and the signal amplitude within each band is characteristic of the size of said target.

31. A method for compensating for random variations in the linearity of the sweep of transmitter frequency of an FM/CW radar system in the processing of the receiver signal characteristic of the range and physical size of a target and thereby linearizing said signal to provide target identification data discriminating said target from background reflections, said method comprising the steps of:

a. developing a raw target data signal containing frequency un-normalized target identification information, wherein the instantaneous frequency of said raw target data signal is characteristic of the range of a target and the amplitude of said raw target data signal is characteristic of the physical size of said target at that range;

b. sampling the transmitter signal and developing a sampling signal containing transmitter frequency sweep information;

c. generating an error signal in response to said sampling signal characteristic of any nonlinearity in the sweep of said transmitter frequency; and, d. linearizing said raw target data signal in response to said error signal to frequency normalize said target data signal by proportionate compensation for any random variation in the linearity of the frequency sweep of said transmitter.

32. The method of claim 31, wherein said step of sampling said transmitter signal and generating an error signal in response thereto comprises the steps of:

a. determining the phase of the transmitter signal over a predetermined time period to develop a measured phase signal;

b. generating a comparison phase signal characteristic of the phase of a transmitter over said predetermined period were said transmitter frequency swept linearly; and, c. comparing said measured phase signal with said comparison phase signal to develop a phase error signal.

33. The method of claim 31, wherein said steps of sampling said transmitter signal and generating an error signal in response thereto comprises the steps of:

a. counting a preselected number of cycles of said transmitter signal and developing a measured time signal representative of the time period therefor;

b. generating a comparison time signal characteristic of the time for said preselected number of cycles were the transmitter frequency swept linearly; and, c. comparing said measured time signal with said comparison time signal to develop a time error signal.

34. The method of claims 31, 32 or 33, wherein said step of developing a raw target data signal and linearizing the same comprise the steps of:

a. developing a first raw target data signal I(t);

b. developing a second raw target data signal Q(t) rotated 90° from said first signal, wherein the phase angle $\phi$ between vectors $(I(t)_n, Q(t)_n)$ rotates in vector space I(t), Q(t); and, c. applying said error signal to rotate $(I(t)_n, Q(t)_n)$ to a corrected signal $(I'(t)_n, Q'(t)_n)$ in accordance with:

$$I'(t) = \cos \phi I(t) + \sin \phi Q(t),$$

$$Q'(t) = \sin \phi I(t) - \cos \phi Q(t);$$

wherein $(I'(t)_n, Q'(t)_n)$ represents target data were the transmitter frequency swept linearly.

35. The method of claim 34, further comprising the step of discriminating the frequency-normalized target data signal into a plurality of frequency bands, the frequency of each of which is indicative of the range of said target and the amplitude of which is indicative of the physical size of said target at that range.

36. The methods of claims 31, 32 or 33, wherein said step of linearizing said raw target data comprises the steps of:

a. time-sampling said raw target data; and, b. applying said error signal to shift the time of time-sampling to that were the transmitter frequency swept linearly.

37. The method of claim 36, further comprising the step of discriminating the frequency-normalized target data signal into a plurality of frequency bands, the frequency of each of which is indicative of the range of said target and the amplitude of which is indicative of the physical size of said target at that range.

38. The method of claim 31, wherein said raw target data signal is applied as a first input to a linearizing mixer means, said method further comprising the steps of:

a. applying said error signal to a voltage controlled oscillator to develop a linearizing signal having a frequency variation characteristic of any nonlinearity in the sweep of said transmitter frequency; and, b. applying said linearizing signal as a second input to said linearizing mixer means to frequency-normalize said raw target data signal.

39. The method of claim 31, wherein said step of generating said error signal comprises the steps of:

a. counting a preselected number of cycles of said sampling signal and measuring the time period thereof to develop a measured time signal; and, b. comparing said measured time signal with a generated time signal characteristic of the time period for an identical number of cycles for a transmitter operating under linear sweep conditions.

40. The method of claim 31, wherein said step of generating said error signal comprises the steps of:

a. determining the phase of said sampling signal over a predetermined time period to generate a measured phase signal; and, b. comparing said measured phase signal with a generated phase signal characteristic of the phase over the identical time period were the transmitter sweep linear, to develop a phase error signal.

41. The method of claims 31, 39 or 40, further comprising the steps of:

a. applying said raw target data signal to a phase rotator; and,
b. applying said error signal to said phase rotator to linearize said raw target data signal.

42. The method of claim 41, further comprising the step of discriminating the frequency-normalized target data signal into a plurality of frequency bands, the frequency of each of which is indicative of the range of said target and the amplitude of which is indicative of the physical size of said target at that range.

43. The method of claims 31, 39 or 40, further comprising the steps of:
a. applying said raw target data signal to a time-sampling converter; and,
b. applying said error signal to adjust the time of sampling of said raw target data to that were the transmitter operating under linear conditions.

44. The method of claim 43, further comprising the step of discriminating the frequency-normalized target data signal into a plurality of frequency bands, the frequency of each of which is indicative of the range of said target and the amplitude of which is indicative of the physical size of said target at that range.

45. The method of claims 31, 32, 33, 38, 39, or 40, further comprising the step of discriminating the frequency-normalized target data signal into a plurality of frequency bands, the frequency of each of which is indicative of the range of said target and the amplitude of which is indicative of the physical size of said target at that range.

46. A method for compensating for random variations in the linearity of the sweep of transmitter frequency of an FM/CW radar system in the processing of the receiver signal characteristic of range and physical size of a target and thereby linearizing said signal to provide target identification data discriminating said target from background reflections, said method comprising the steps of:
a. mixing the transmitter and receiver signals in a first mixer means to develop a first raw target data signal I(t);
b. mixing said transmitter and receiver signals in a second mixer means to develop a second raw target data signal Q(t) rotated from said first signal by 90°, and wherein the phase angle $\phi$ between vectors $(I(t)_n, Q(t)_n)$ rotates in vector space I(t), Q(t);
c. applying said raw target data signals to a phase rotator;
d. mixing said transmitter signal with a standard reference frequency signal to develop a transmitter characteristic signal;
e. applying said transmitter characteristic signal to a phase detector means to develop a measured phase signal representative of the phase of said transmitter frequency over a predetermined time period;
f. comparing said measured phase signal with a generated phase signal characteristic of the phase of a transmitter operating under linear frequency sweep conditions over said predetermined period, to develop a phase error signal indicative of and proportional to any nonlinear operation of said transmitter;
g. applying said phase error signal to said phase rotator to rotate said data signals I(t), Q(t) to yield frequency-normalized data signals I'(t), Q'(t) in accordance with the relationships:

$I'(t) = \cos \phi I(t) + \sin \phi Q(t)$, $Q'(t) = \sin \phi I(t) - \cos \phi Q(t)$; and, h. processing said frequency-normalized signals in a filter network for discriminating said signals into a plurality of frequency bands, wherein the frequency of each band is characteristic of the range of said target and the signal amplitude within each band is characteristic of the size of said target.

47. The method of claim 46, wherein said steps of mixing said transmitter and receiver signals include the steps of:
a. mixing said transmitter and receiver signals in a high frequency mixer means to develop a raw target data signal;
b. applying said raw target data signal to first and second frequency-reduction mixer means; and,
c. applying a standard frequency signal as a second input to each of said frequency-reduction mixer means, wherein one of said inputs is rotated by 90°, to develop said first and second raw target data signals I(t) and Q(t), respectively.

48. A method for compensation for random variations in the linearity of the sweep of transmitter frequency of an FM/CW radar system in the processing of the receiver signal characteristic of the range and physical size of a target and thereby linearizing said signal to provide target identification data discriminating said target from background reflections, said method comprising the steps of:
a. mixing transmitter and receiver signals in a mixer means to develop a raw target data signal;
b. applying said raw target data signal to a time-sampling converter means;
c. mixing said transmitter signal with a standard frequency signal to develop a transmitter characteristic signal;
d. counting a preselected number of cycles of said transmitter characteristic signal and measuring the time period therefor to develop a measured time signal;
e. comparing said measured time signal with a generated time signal characteristic of the time for the identical number of cycles for a transmitter operating under linear frequency sweep conditions, to develop a time error signal;
f. applying said error signal and said generated time signal as inputs to a phase converter means to generate a phase error signal;
g. converting said phase signal into a time-sampling signal;
h. applying said time-sampling signal to said time-sampling converter to alter the sampling time of said raw data signal to conform to that were the transmitter frequency swept linearly to yield a frequency-normalized target data signal; and,
i. processing said frequency-normalized signal in a filter network for discriminating said signal into a plurality of frequency bands, wherein the frequency of each band is characteristic of the range of said target and the signal amplitude within each band is characteristic of the size of said target.

49. The methods of claims 46, 47 or 48, wherein said error signal is processed by applying same to a time delay line equivalent to the propagation time of said transmitter signal and then comparing the delayed signal with itself to yield a processed error signal.

50. A method for compensating for random variations in the linearity of the sweep of transmitter frequency of an FM/CW radar system in the processing of the receiver signal characteristic of the range and physical size of a target and thereby linearizing said signal to provide target identification data discriminating said target from background reflections, said method comprising the steps of:
- a. applying transmitter and receiver signals to a first mixer means to develop a raw target data signal containing frequency un-normalized target identification information;
- b. applying said raw target data signal as a first input to a linearizing mixer means;
- c. mixing said transmitter signal with a standard frequency signal to develop a transmitter characteristic signal of reduced frequency containing transmitter frequency sweep information;
- d. generating an error signal in response to said transmitter characteristic signal, characteristic of any nonlinearity of the sweep of said transmitter frequency;
- e. applying said error signal as an input to a voltage controlled oscillator to develop a correction signal having a frequency variation characteristic of and proportional to any nonlinearity in the sweep of said transmitter frequency;
- f. applying said correction signal as a second input to said linearizing mixer to develop a frequency-normalized target data signal; and,
- g. applying said normalized target data signal to a processor means wherein said signal is discriminated into a plurality of frequency bands, the frequency of each band being indicative of the range of said target and the amplitude of said signal within each band being indicative of the physical size of said target at that range.

* * * * *